United States Patent
Cadima et al.

(10) Patent No.: US 12,069,775 B2
(45) Date of Patent: Aug. 20, 2024

(54) COOKTOP APPLIANCE AND HEATING ELEMENT HAVING A HEAT TRANSFER DISK AND A THERMOSTAT

(71) Applicant: Haier US Appliance Solutions, Inc., Wilmington, DE (US)

(72) Inventors: Paul Bryan Cadima, Crestwood, KY (US); Eugenio Gomez, Louisville, KY (US); Dimitrios Iordanoglou, Plymouth, MN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 1034 days.

(21) Appl. No.: 16/668,669

(22) Filed: Oct. 30, 2019

(65) Prior Publication Data

US 2021/0136874 A1 May 6, 2021

(51) Int. Cl.
| | |
|---|---|
| *H05B 1/02* | (2006.01) |
| *F24C 7/08* | (2006.01) |
| *H05B 3/00* | (2006.01) |
| *G01K 1/143* | (2021.01) |
| *G01K 1/24* | (2006.01) |

(52) U.S. Cl.
CPC ........... *H05B 1/0266* (2013.01); *F24C 7/088* (2013.01); *H05B 1/0213* (2013.01); *H05B 3/0014* (2013.01); *H05B 3/0019* (2013.01); *F24C 7/087* (2013.01); *G01K 1/143* (2013.01); *G01K 1/24* (2013.01)

(58) Field of Classification Search
CPC .. H05B 1/0266; H05B 1/0213; H05B 3/0014; H05B 3/0019; H05B 3/748; F24C 7/087; F24C 7/088; G01K 1/24; G01K 1/143
See application file for complete search history.

(56) References Cited

U.S. PATENT DOCUMENTS

| | | | |
|---|---|---|---|
| 3,162,752 A * | 12/1964 | Kinsella, Jr. | |
| 4,091,354 A * | 5/1978 | Deubel | H01H 37/5427 337/380 |
| 6,246,033 B1 | 6/2001 | Shah | |
| 9,132,302 B2 * | 9/2015 | Luongo | F24C 3/122 |
| 10,634,363 B2 * | 4/2020 | Gomez | F24C 15/105 |
| 2013/0139706 A1 * | 6/2013 | Robertson | A47J 37/07 99/419 |
| 2018/0180292 A1 * | 6/2018 | Wang | A21B 1/33 |
| 2018/0238559 A1 * | 8/2018 | Pasqual | H05B 1/0266 |

FOREIGN PATENT DOCUMENTS

| | | |
|---|---|---|
| CN | 1133435 A | 10/1996 |
| CN | 206252382 U | 6/2017 |
| CN | 207779570 U * | 8/2018 |
| JP | 3348393 B2 * | 11/2002 |

OTHER PUBLICATIONS

Circuit Globe, Bimetallic Thermometer, 2018 (Year: 2018).*
GE Appliances, Sensi Temp Technology, 2018 (Year: 2018).*

* cited by examiner

*Primary Examiner* — Dana Ross
*Assistant Examiner* — Kuangyue Chen
(74) *Attorney, Agent, or Firm* — Dority & Manning, P.A.

(57) ABSTRACT

A cooktop appliance or heating element, as provided herein, may include a thermostat within the heating zone of the heating element. The thermostat may include a base and a top cap held on the base. The heat transfer disk may be joined to the thermostat at the top cap.

20 Claims, 6 Drawing Sheets

COOKTOP APPLIANCE AND HEATING ELEMENT HAVING A HEAT TRANSFER DISK AND A THERMOSTAT

FIELD OF THE INVENTION

The present subject matter relates generally to electric heating elements for appliances, such as for cooktop or range appliances.

BACKGROUND OF THE INVENTION

Cooking appliances that include a cooktop traditionally have at least one heating element (e.g., electric coil heating element) positioned on a panel proximate a cooktop surface for use in heating or cooking an object, such as a cooking utensil, and its contents. Recent regulatory requirements mandate that electric coil heating elements on cooktop appliances be incapable of heating cooking oil to an oil ignition temperature. Thus, certain electric coil heating elements utilize a bimetallic thermostat to interrupt power to the coil when the thermostat reaches a tripping point. In some cooktops, the thermostat is remotely positioned from the cookware and infers the cookware temperature through correlation. In other cooktops, the thermostat contacts a bottom of the cookware to improve correlation. However, whether remotely positioned from the cookware or contacting the cookware, imperfect correlation requires conservative thermostat calibrations and thus results in reduced performance.

Known bimetallic thermostats have shortcomings. In particular, the flatness of the coil has a significant impact to system performance, as does the flatness of the bottom of the cookware. Poor contact between the cookware and the coil cause the portions of the coil that have poor conduction to the cookware to glow red hot and radiate heat. Radiative heat transfer from the coil to the thermostat can overcome the heat transfer from the cookware to the thermostat, causing the thermostat to trip early.

As a result, it would be useful to have a cooktop appliance addressing one or more of the above identified issues. In particular, it may be advantageous to provide a cooktop appliance having a thermostat with one or more features for enhancing contact (e.g., with a utensil on a heating element) or conductive heat transfer from a utensil to a thermostat (e.g., without being unduly affected by radiative heat transfer from the heating element).

BRIEF DESCRIPTION OF THE INVENTION

Aspects and advantages of the invention will be set forth in part in the following description, or may be obvious from the description, or may be learned through practice of the invention.

In one exemplary aspect of the present disclosure, an electric resistance heating coil assembly is provided. The electric resistance heating coil assembly may include a spiral wound sheathed heating element, a thermostat, and a heat transfer disk. The spiral wound sheathed heating element may have a first coil section and a second coil section. The thermostat may include a base and a top cap held on the base. The thermostat may be connected in series between the first and second coil sections of the spiral wound sheathed heating element. The thermostat may be spring loaded such that a distal end of the thermostat is urged away from a top surface of the spiral wound sheathed heating element. The heat transfer disk may be joined to the thermostat at the top cap. The heat transfer disk may be positioned concentrically with a center of the spiral wound sheathed heating element.

In another exemplary aspect of the present disclosure, a cooktop appliance is provided. The cooktop appliance may include a heating element and a sensor support assembly. The heating element may define a heating zone. The sensor support assembly may be positioned within the heating zone of the heating element. The sensor support assembly may include an outer shroud, a thermostat mounted to the outer shroud, and a heat transfer disk. The thermostat may include a base and a top cap held on the base. The heat transfer disk may be joined to the thermostat at the top cap. The heat transfer disk may extend above the outer shroud.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
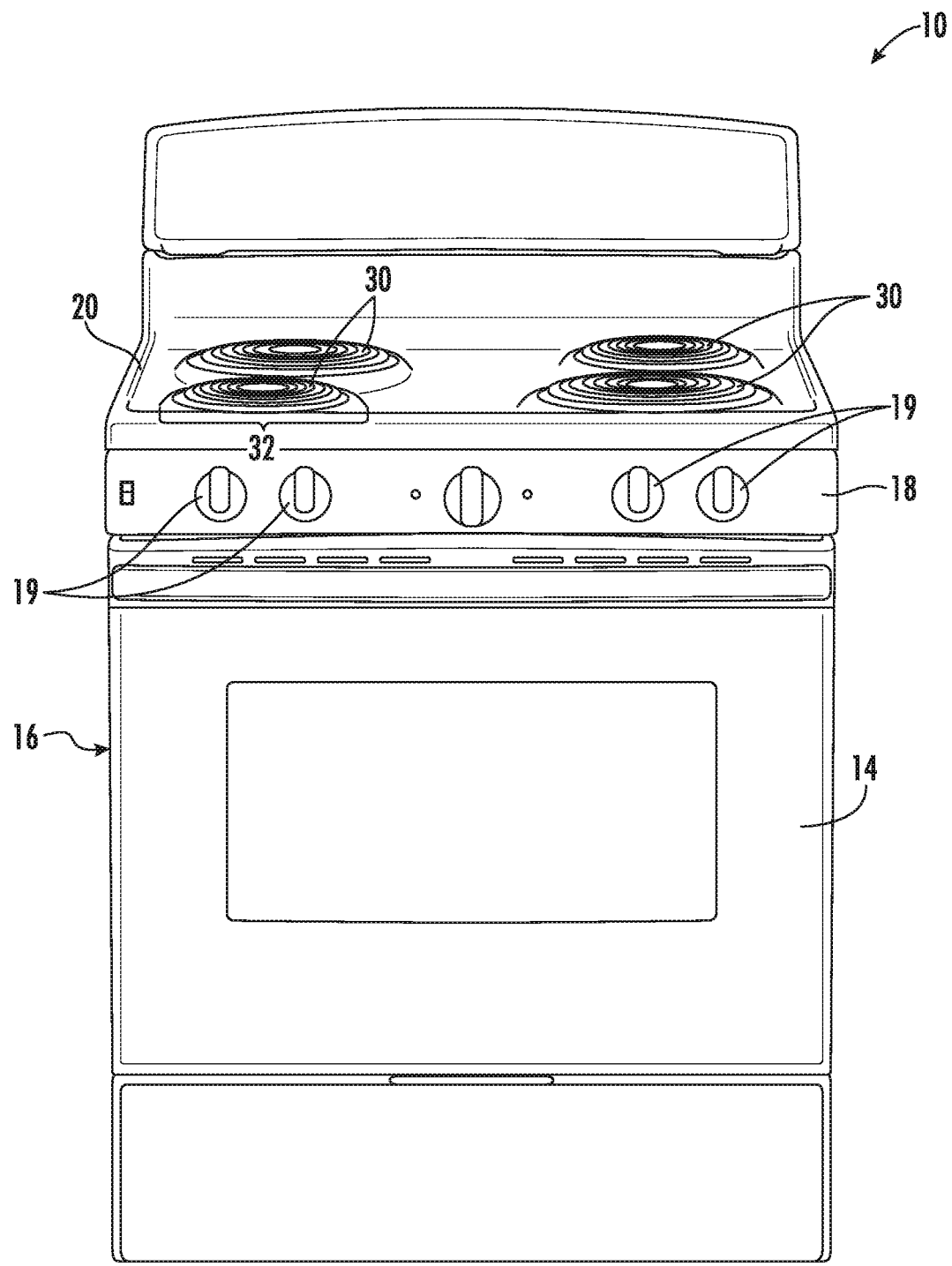
FIG. 1 provides a front, perspective view of a range appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Turning now to the figures, FIG. 1 provides a front, perspective view of a range appliance 10 according to exemplary embodiments of the present disclosure. Range appliance 10 is provided by way of example only and is not intended to limit the present subject matter to the particular arrangement shown in FIG. 1. Thus, the present subject matter may be used with other cooktop appliance configurations (e.g., double oven range appliances, standalone cooktop appliances, etc.).

Generally, a top panel 20 of range appliance 10 includes one or more heating elements 30. Heating elements 30 may be, for example, electrical resistive heating elements. Range appliance 10 may include only one type of heating element 30, or range appliance 10 may include a combination of different types of heating elements 30, such as a combination of electrical resistive heating elements and gas burners. Further, heating elements 30 may have any suitable shape and size, and a combination of heating elements 30 of different shapes and sizes may be used.

Generally, each heating element 30 defines a heating zone 32 on which a cooking utensil, such as a pot, pan, or the like, may be placed to cook or heat food items placed in the cooking utensil. In some embodiments, range appliance 10 also includes a door 14 that permits access to a cooking chamber 16 of range appliance 10 (e.g., for cooking or baking of food items therein). A control panel 18 having controls 19 permits a user to make selections for cooking of food items—although shown on a front panel of range appliance 10, control panel 18 may be positioned in any suitable location. Controls 19 may include buttons, knobs, and the like, as well as combinations thereof. As an example, a user may manipulate one or more controls 19 to select a temperature or a heat or power output for each heating element 30.

Figure 2:
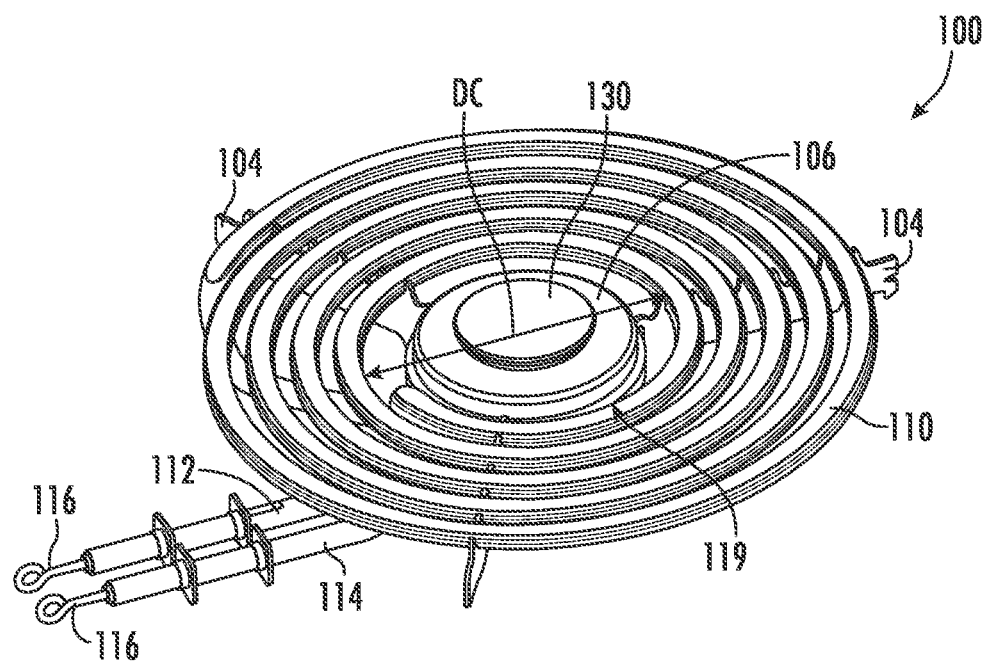
FIG. 2 provides a top, perspective view of an electric resistance heating coil assembly of the exemplary range appliance of FIG. 1.
Figure 3:
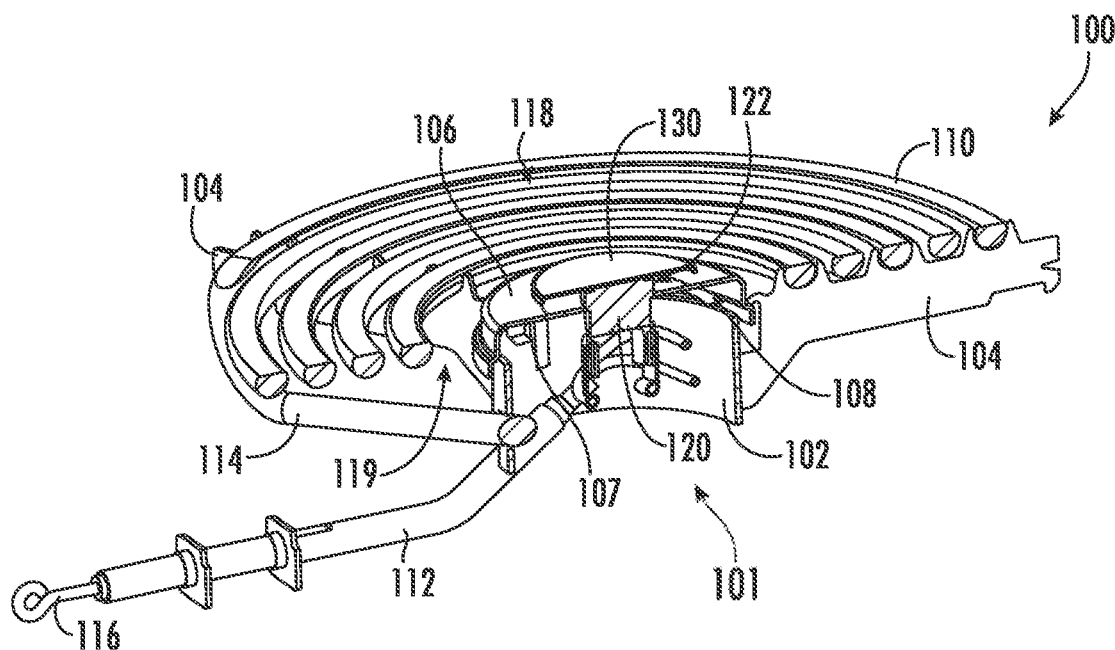
FIG. 3 provides a section view of the exemplary electric resistance heating coil assembly of FIG. 2.
Figure 4:
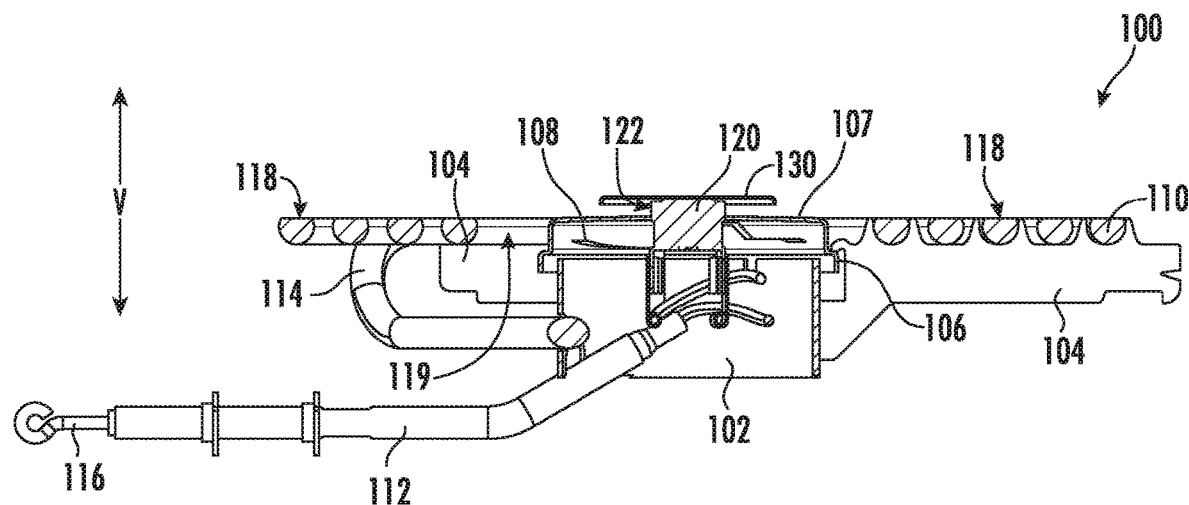
FIG. 4 provides a section view of the exemplary electric resistance heating coil assembly of FIG. 2.
Figure 6:
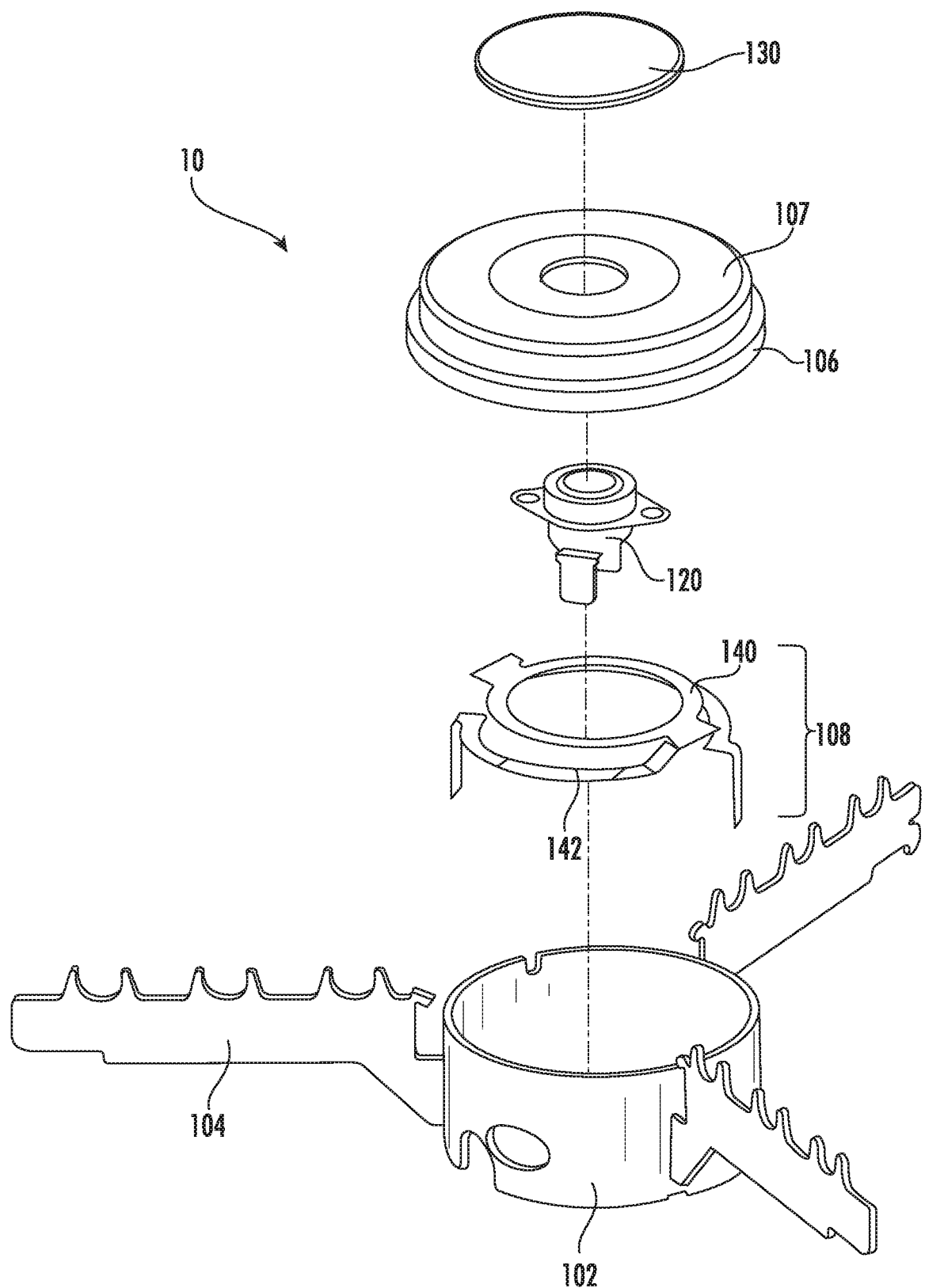
FIG. 6 provides an exploded perspective view of a portion of the exemplary heating coil assembly of FIG. 2.

Turning now to FIGS. 2 through 4 and 6, FIG. 2 provides a top, perspective view of an electric resistance heating coil assembly 100 of range appliance 10. FIGS. 3 and 4 provide section views of electric resistance heating coil assembly 100. FIG. 6 provides an exploded perspective view of a portion of electric resistance heating coil assembly 100. Electric resistance heating coil assembly 100 may be used as one or more of heating elements 30 in range appliance 10. However, while described in greater detail below in the context of range appliance 10, it will be understood that electric resistance heating coil assembly 100 may be used in or with any suitable cooktop appliance in alternative example embodiments. As discussed in greater detail below, electric resistance heating coil assembly 100 includes features for facilitating conductive heat transfer between a thermostat (e.g., bimetallic thermostat 120) and a utensil positioned on electric resistance heating coil assembly 100.

As shown in FIGS. 2 through 4, some embodiments of electric resistance heating coil assembly 100 include a spiral wound sheathed heating element 110. Spiral wound sheathed heating element 110 may include a first coil section 112 and a second coil section 114. In certain embodiments, spiral wound sheathed heating element 110 also has a pair of terminals 116. Each of first and second coil sections 112, 114 may be directly coupled or connected to a respective terminal 116. A voltage differential across terminals 116 induces an electrical current through spiral wound sheathed heating element 110, and spiral wound sheathed heating element 110 may increase in temperature by resisting the electrical current through spiral wound sheathed heating element 110.

Within the heating zone 32, a sensor support assembly 101, including thermostat 120, is positioned. When assembled, bimetallic thermostat 120 is connected, for example, in series between first and second coil sections 112, 114 of spiral wound sheathed heating element 110. Bimetallic thermostat 120 opens and closes in response to a temperature of bimetallic thermostat 120. For example, bimetallic thermostat 120 may be spring loaded such that a distal end 122 of bimetallic thermostat 120 is urged away from a top surface 118 of spiral wound sheathed heating element 110. Thus, distal end 122 of bimetallic thermostat 120 may be urged towards a utensil (not shown) positioned on top surface 118 of spiral wound sheathed heating element 110. Bimetallic thermostat 120 may measure the temperature of the utensil on top surface 118 of spiral wound sheathed heating element 110 due to heat transfer between the utensil and bimetallic thermostat 120. As discussed in greater detail below, electric resistance heating coil assembly 100 includes features for facilitating conductive heat transfer between the utensil on top surface 118 of spiral wound sheathed heating element 110 and bimetallic thermostat 120.

Sensor support assembly 101 may also include a shroud 102 and coil support arms 104. Coil support arms 104 extend (e.g., radially) from shroud 102, and spiral wound sheathed heating element 110 is positioned on and supported by coil support arms 104. Coil support arms 104 may rest on top panel 20 to support electric resistance heating coil assembly 100 on top panel 20. Bimetallic thermostat 120 may be mounted to a shroud cover 106 (e.g., on a top wall 107 of shroud cover 106). When assembled, shroud cover 106 extends over shroud 102. In particular, a top of shroud 102 may be nested in shroud cover 106. When assembled, shroud 102, including shroud cover 106, generally shields bimetallic thermostat 120 from at least a portion of the heat generated at spiral wound sheathed heating element 110. Optionally, shroud 102, including shroud cover 106, is formed from a relatively low thermal conductivity metal (e.g., steel or a steel alloy).

In some embodiments, a spring bracket 108 biases shroud cover 106 and bimetallic thermostat 120 thereon upwardly. As shown, spring bracket 108 may include a mounting plate 140 and one or more biasing arms 142 extending therefrom. When assembled, bimetallic thermostat 120 is mounted or fixed to mounting plate 140. For instance, bimetallic thermostat 120 can be welded, clipped, or otherwise attached to mounting plate 140 with mechanical fasteners (e.g., screws or rivets), or a combination thereof. Biasing arms 142 may be resilient members, which generally urge mounting plate 140 upward. Spring bracket 108, including biasing arms 142, may be formed from any suitable high yield strength material. For instance, spring bracket 108 is formed of a stainless steel, full hard, or spring tempered material. Spring bracket 108 can be formed of other suitable high yield strength materials as well.

Generally, electric resistance heating coil assembly 100 includes a heat transfer disk 130. Heat transfer disk 130 is positioned on bimetallic thermostat 120 at distal end 122 of bimetallic thermostat 120. For example, heat transfer disk 130 may contact distal end 122 of bimetallic thermostat 120. Thus, heat transfer disk 130 may be in direct, thermal, conductive communication with bimetallic thermostat 120. Because heat transfer disk 130 is positioned at distal end 122 of bimetallic thermostat 120, heat transfer disk 130 may also be urged away from top surface 118 of spiral wound sheathed heating element 110. In particular, heat transfer disk 130 may be urged against the utensil on top surface 118 of spiral wound sheathed heating element 110 (e.g., due to the spring loading of bimetallic thermostat 120).

Heat transfer disk 130 or bimetallic thermostat 120 may be positioned concentrically with a center 119 of spiral wound sheathed heating element 110. Center 119 of spiral wound sheathed heating element 110 may be open, and spiral wound sheathed heating element may extend circumferentially around heat transfer disk 130 or bimetallic thermostat 120 at center 119. Heat transfer disk 130 may also cover distal end 122 of bimetallic thermostat 120. In some embodiments, heat transfer disk extends above and over at least a portion of shroud 102, including shroud cover 106.

When assembled, heat transfer disk 130 may be positioned between bimetallic thermostat 120 and a utensil on top surface 118 of spiral wound sheathed heating element 110, and heat transfer disk 130 may contact the utensil. Heat transfer disk 130 may also include a flange 132 that extends downwardly towards shroud cover 106 towards shroud cover 106.

Figure 5:
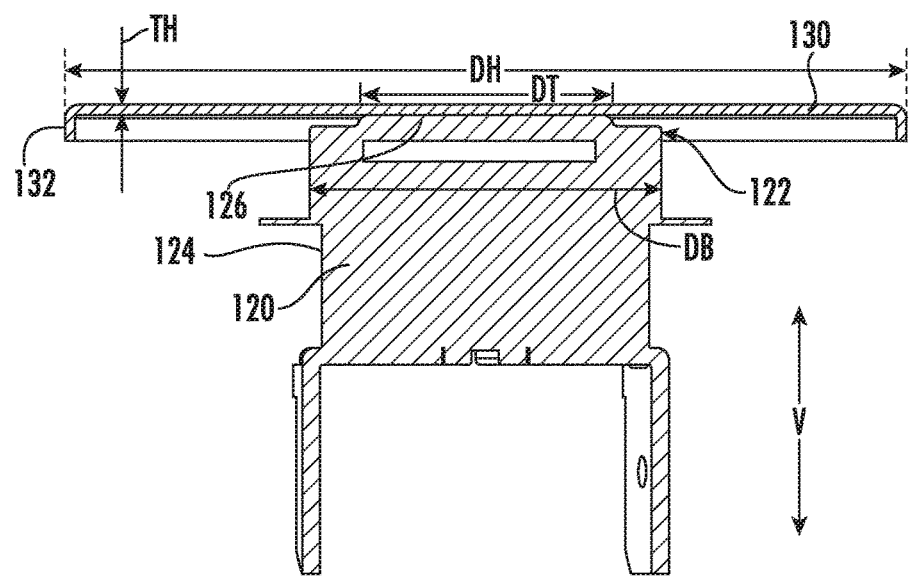
FIG. 5 provides a simplified, section view of a heat transfer disk and a bimetallic thermostat of the exemplary electric resistance heating coil assembly of FIG. 2.

Turning now to FIG. 5, FIG. 5 provides a simplified, section view of heat transfer disk 130 and bimetallic thermostat 120. As shown, bimetallic thermostat 120 includes a discrete base 124 and top cap 126 that is held on base 124. For instance, at least a portion of top cap 126 may extend above base 124 and define an uppermost surface of bimetallic thermostat 120 at distal end 122. In some embodiments, base 124 and top cap 126 are formed of or include separate or distinct materials. For instance, base 124 may be formed from a first material, such as a relatively low thermal conductivity metal (e.g., steel or a steel alloy), while top cap 126 is formed from a second material, such as a relatively high thermal conductivity metal (e.g., aluminum, copper, a copper alloy, or an aluminum alloy). Top cap 126 may thus absorb and conduct heat faster or more readily than base 124.

When assembled, heat transfer disk 130 may be joined to bimetallic thermostat 120 at top cap 126. For example, heat transfer disk 130 may be spot welded, seam welded, ultrasonic welded, or resistance welded to top cap 126 (e.g., to provide direct thermal conductive communication between bimetallic thermostat 120 and heat transfer disk 130). Heat transfer disk 130 may be formed of aluminum, copper, a copper alloy, or an aluminum alloy. Such materials advantageously facilitate conductive heat transfer between the utensil on top surface 118 of spiral wound sheathed heating element 110 and heat transfer disk 130. In certain embodiments, top cap 126 and heat transfer disk 130 may be formed from a common material, such as one of aluminum, copper, a copper alloy, or an aluminum alloy, in order to advantageously facilitate conductive heat transfer between bimetallic thermostat 120 and heat transfer disk 130, and facilitate the joining of heat transfer disk 130 to thermostat top cap 126.

Generally, heat transfer disk 130 may be sized to facilitate conductive heat transfer between a utensil on top surface 118 of spiral wound sheathed heating element 110 and bimetallic thermostat 120. For example, a diameter DH of heat transfer disk 130 may be larger than a diameter DT of top cap 126 of bimetallic thermostat 120 (e.g., in a plane that is perpendicular to the vertical direction V). Additionally or alternatively, diameter DH of heat transfer disk 130 may be larger than a maximum diameter DB defined by base 124 of bimetallic thermostat 120 (e.g., no less than two times greater in a plane that is perpendicular to the vertical direction V). Additionally or alternatively, the diameter DH of heat transfer disk 130 may be less than a diameter DC (FIG. 2) of center 119 of spiral wound sheathed heating element 110. The sizing of heat transfer disk 130 relative to bimetallic thermostat 120 may advantageously assist conductive heat transfer from the utensil on top surface 118 of spiral wound sheathed heating element 110 to bimetallic thermostat 120.

In certain example embodiments, the diameter DH of heat transfer disk 130 may be no less than one inch (1") and no greater than one and a half inches (1.5"). Conversely, a thickness TH of heat transfer disk 130 (e.g., perpendicular to the diameter DH of heat transfer disk 130) may be no less than two hundredths of an inch (0.02") and no greater than five hundredths of an inch (0.05"). Additionally or alternatively, a ratio of the diameter DH of heat transfer disk 130 to the thickness TH of heat transfer disk 130 may be no less than twenty (20) and no greater than seventy-five (75). Such sizing of heat transfer disk 130 may advantageously assist conductive heat transfer from the utensil on top surface 118 of spiral wound sheathed heating element 110 to bimetallic thermostat 120.

Figure 7:
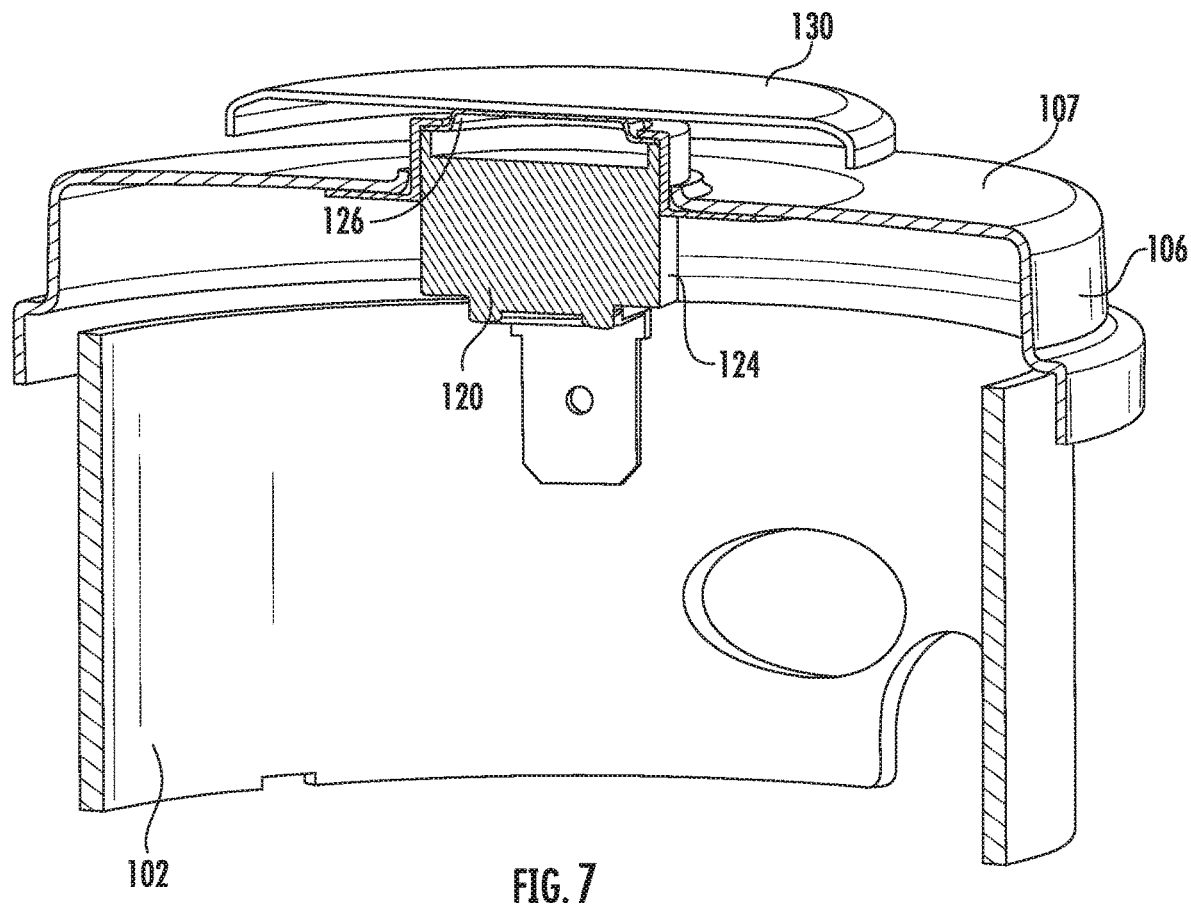
FIG. 7 provides a section view of a portion of an electric resistance heating coil assembly according to exemplary embodiments of the present disclosure.
Figure 8:
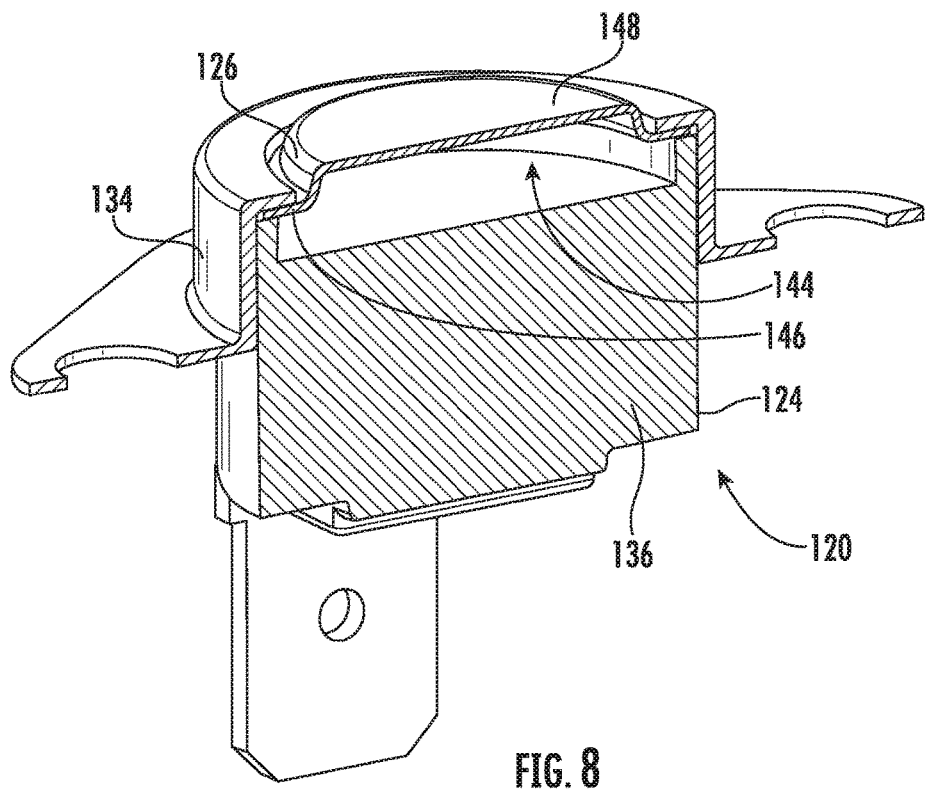
FIG. 8 provides a section view of the exemplary bimetallic thermostat of FIG. 7.

Turning now to FIGS. 7 and 8, FIGS. 7 and 8 provide further section views of portions of electric resistance heating assembly 100. Specifically, further details are illustrated of bimetallic thermostat 120 according to exemplary embodiments of the present disclosure. As shown, top cap 126 may be seated within base 124. In some embodiments, base 124 defines a central opening 144 through which top cap 126 extends. For example, top cap 126 may include a radial flange 146 and a raised upper surface 148 that is positioned over central opening 144. As shown, raised upper surface 148 may be positioned radially inward from and higher than radial flange 146. When assembled, radial flange 146 may be fixed (e.g., crimped or otherwise fixedly attached) within base 124.

Optionally, base 124 may include a multi-piece assembly having an upper casing 134 (e.g., defining central opening 144) fitted over a lower frame 136. When joined together, radial flange 146 may be sandwiched between upper casing 134 and lower frame 136. From radial flange 146, top cap 126 may extend generally upward and through central opening 144 such that the raised surface is held above (e.g., higher than) upper casing 134 and lower frame 136.

Figure 9:
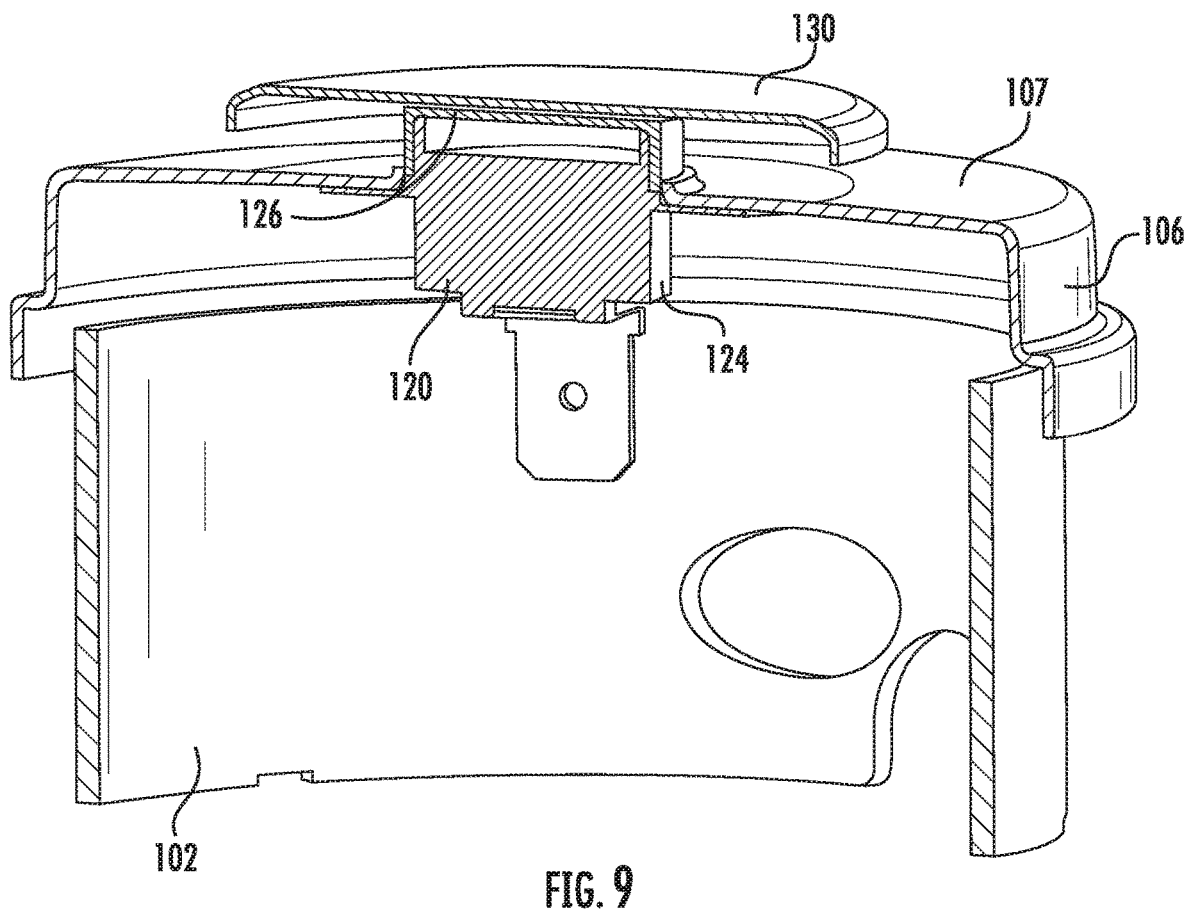
FIG. 9 provides a section view of a portion of an electric resistance heating coil assembly according to exemplary embodiments of the present disclosure.
Figure 10:
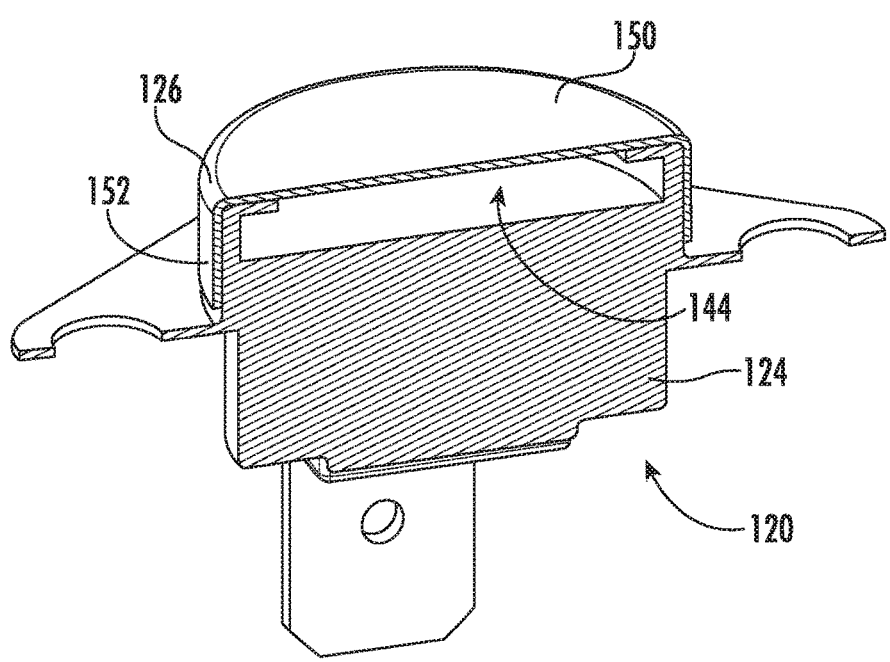
FIG. 10 provides a section view of the exemplary bimetallic thermostat of FIG. 9.

Turning now to FIGS. 9 and 10, FIGS. 9 and 10 provide further section views of portions of electric resistance heating assembly 100. Specifically, further details are illustrated of bimetallic thermostat 120 according to other exemplary embodiments of the present disclosure. As shown, top cap 126 may be seated on top of or over base 124. In some embodiments, top cap 126 is press fitted on top of base 124. Top cap 126 may include an upper surface 150 that extends across base 124 and a cap wall 152 that extends downwardly from upper surface 150 around base 124. Optionally, base 124 may define a central opening 144. Thus, the upper surface 150 of top cap 126 may extend across and close central opening 144 while cap wall 152 contacts base 124, holding upper surface 150 in place.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electric resistance heating coil assembly, comprising:
   a spiral wound sheathed heating element having a first coil section and a second coil section;
   a thermostat comprising a base and a top cap held on the base, the thermostat being connected in series between the first and second coil sections of the spiral wound sheathed heating element, the thermostat being spring loaded such that a distal end of the thermostat is urged away from a top surface of the spiral wound sheathed heating element;
   a heat transfer disk joined to the thermostat at the top cap, the heat transfer disk positioned concentrically with a center of the spiral wound sheathed heating element,
   a shroud extending about the thermostat; and
   a shroud cover disposed below the top cap and below the heat transfer disk to define an air gap between the heat transfer disk and a top wall of the shroud cover, the shroud cover insulating the thermostat at the base, the thermostat being mounted to the shroud cover,
   wherein a top of the shroud is nested in the shroud cover.

2. The electric resistance heating coil assembly of claim 1, further comprising:
   a spring bracket mounted to the base such that the distal end of the thermostat is urged away from the top surface of the spiral wound sheathed heating element.

3. The electric resistance heating coil assembly of claim 1, wherein a diameter of the heat transfer disk is larger than a diameter of the top cap.

4. The electric resistance heating coil assembly of claim 1, wherein the base of the thermostat comprises a first material, and wherein the heat transfer disk comprises a second material distinct from the first material.

5. The electric resistance heating coil assembly of claim 4, wherein the second material of the heat transfer disk is formed of aluminum, copper, a copper alloy, or an aluminum alloy.

6. The electric resistance heating coil assembly of claim 1, wherein the heat transfer disk is spot welded, seam welded, ultrasonic welded, or resistance welded to the top cap.

7. The electric resistance heating coil assembly of claim 1, wherein the top cap is seated over the base.

8. The electric resistance heating coil assembly of claim 1, wherein the top cap is press fitted on top of the base.

9. A cooktop appliance, comprising:
   a heating element defining a heating zone; and
   a sensor support assembly positioned within the heating zone of the heating element, the sensor support assembly comprising
   a shroud cover,
   a shroud having a top nested in the shroud cover,
   a thermostat mounted to the shroud cover to be insulated by the shroud cover, the thermostat comprising a base and a top cap held on the base above the shroud cover, and
   a heat transfer disk joined to the thermostat at the top cap, the heat transfer disk extending above the shroud cover to define an air gap between the heat transfer disk and a top wall of the shroud cover, the shroud cover insulating.

10. The cooktop appliance of claim 9, wherein the sensor support assembly further comprises a spring bracket mounted to the base such that a distal end of the thermostat is urged away from a top surface of the heating element.

11. The cooktop appliance of claim 9, wherein a diameter of heat transfer disk is larger than a diameter of the top cap.

12. The cooktop appliance of claim 9, wherein the base of the thermostat comprises a first material, and wherein the heat transfer disk comprises a second material distinct from the first material.

13. The cooktop appliance of claim 12, wherein the second material of the heat transfer disk is formed of aluminum, copper, a copper alloy, or an aluminum alloy.

14. The cooktop appliance of claim 9, wherein the heat transfer disk is spot welded, seam welded, ultrasonic welded, or resistance welded to the top cap.

15. The cooktop appliance of claim 9, wherein the top cap is seated over the base.

16. The cooktop appliance of claim 9, wherein the top cap is press fitted on top of the base.

17. An electric resistance heating coil assembly, comprising:
   a spiral wound sheathed heating element having a first coil section and a second coil section;
   a thermostat comprising a base and a top cap held on the base, the thermostat being connected in series between the first and second coil sections of the spiral wound sheathed heating element, the thermostat being spring loaded such that a distal end of the thermostat is urged away from a top surface of the spiral wound sheathed heating element;
   a heat transfer disk joined to the thermostat at the top cap, the heat transfer disk positioned concentrically with a center of the spiral wound sheathed heating element;
   a shroud extending about the thermostat;
   a shroud cover disposed below the top cap and below the heat transfer disk to define an air gap between the heat transfer disk and a top wall of the shroud cover, the shroud cover insulating the thermostat at the base, the thermostat being mounted to the shroud cover; and
   a spring bracket disposed within the shroud and supporting the shroud cover such that a distal end of the thermostat is urged away from a top surface of the spiral wound sheathed heating element,
   wherein a diameter of the heat transfer disk is larger than a diameter of the top cap.

18. The electric resistance heating coil assembly of claim 17, wherein the base of the thermostat comprises a first material,
   wherein the heat transfer disk comprises a second material distinct from the first material, and
   wherein the heat transfer disk is spot welded, seam welded, ultrasonic welded, or resistance welded to the top cap.

19. The electric resistance heating coil assembly of claim 17, wherein the top cap is seated within the base.

20. The electric resistance heating coil assembly of claim 17, wherein the top cap is press fitted on top of the base.

* * * * *